(12) United States Patent
Bevilacqua et al.

(10) Patent No.: US 8,387,897 B2
(45) Date of Patent: Mar. 5, 2013

(54) VAPORIZATION WATER DISTRIBUTION PLANT

(75) Inventors: Leopoldo Bevilacqua, Zurich (CH); Roberto Gasparetto, Milan (IT); Aldo Di Rienzo, Assago-Milano (IT)

(73) Assignee: Edoardo Lossa S.p.A., Milan (IT)

( * ) Notice: Subject to any disclaimer, the term of this patent is extended or adjusted under 35 U.S.C. 154(b) by 1443 days.

(21) Appl. No.: 10/561,065

(22) PCT Filed: Jun. 16, 2004

(86) PCT No.: PCT/IB2004/002044
§ 371 (c)(1),
(2), (4) Date: Feb. 24, 2006

(87) PCT Pub. No.: WO2004/110639

PCT Pub. Date: Dec. 23, 2004

(65) Prior Publication Data
US 2006/0243826 A1  Nov. 2, 2006

(30) Foreign Application Priority Data
Jun. 19, 2003 (IT) .................... MI03A1244

(51) Int. Cl.
*B05B 15/06* (2006.01)

(52) U.S. Cl. ......... 239/279; 239/280; 239/285; 239/450

(58) Field of Classification Search .............. 239/279, 239/280, 285, 450
See application file for complete search history.

(56) References Cited

U.S. PATENT DOCUMENTS

| | | | |
|---|---|---|---|
| 2,605,140 A | 7/1952 | Bartling | |
| 3,587,972 A * | 6/1971 | Weeth | 239/229 |
| 4,582,257 A * | 4/1986 | Siegler | 239/197 |
| 4,914,339 A * | 4/1990 | Hayman et al. | 312/115 |
| 5,867,977 A | 2/1999 | Zachary et al. | |
| 2002/0100819 A1 | 8/2002 | Chapple | |

FOREIGN PATENT DOCUMENTS

| | | |
|---|---|---|
| FR | 2 539 056 A | 4/1984 |
| FR | 2 540 405 A | 8/1984 |
| GB | 493 451 A | 10/1938 |
| GB | 2 382 847 A | 6/2003 |

OTHER PUBLICATIONS

International Search Report Dated Nov. 11, 2004.

* cited by examiner

*Primary Examiner* — Christopher Kim
(74) *Attorney, Agent, or Firm* — Hedman & Costigan, P.C.

(57) ABSTRACT

A vaporization water distribution assembly in particular for the feeding of gas turbines consisting of at least one feeding collector with nozzle-holder ramps (15) equipped with a series of nozzles (14), in which there are tighteners (18,24) both for the assembly and blockage of the nozzle-holder ramps (15) with respect to at least one collector and also of the nozzles (14) to the nozzle-holder ramps (15), both blockages being effected with the interposition of washers.

20 Claims, 7 Drawing Sheets

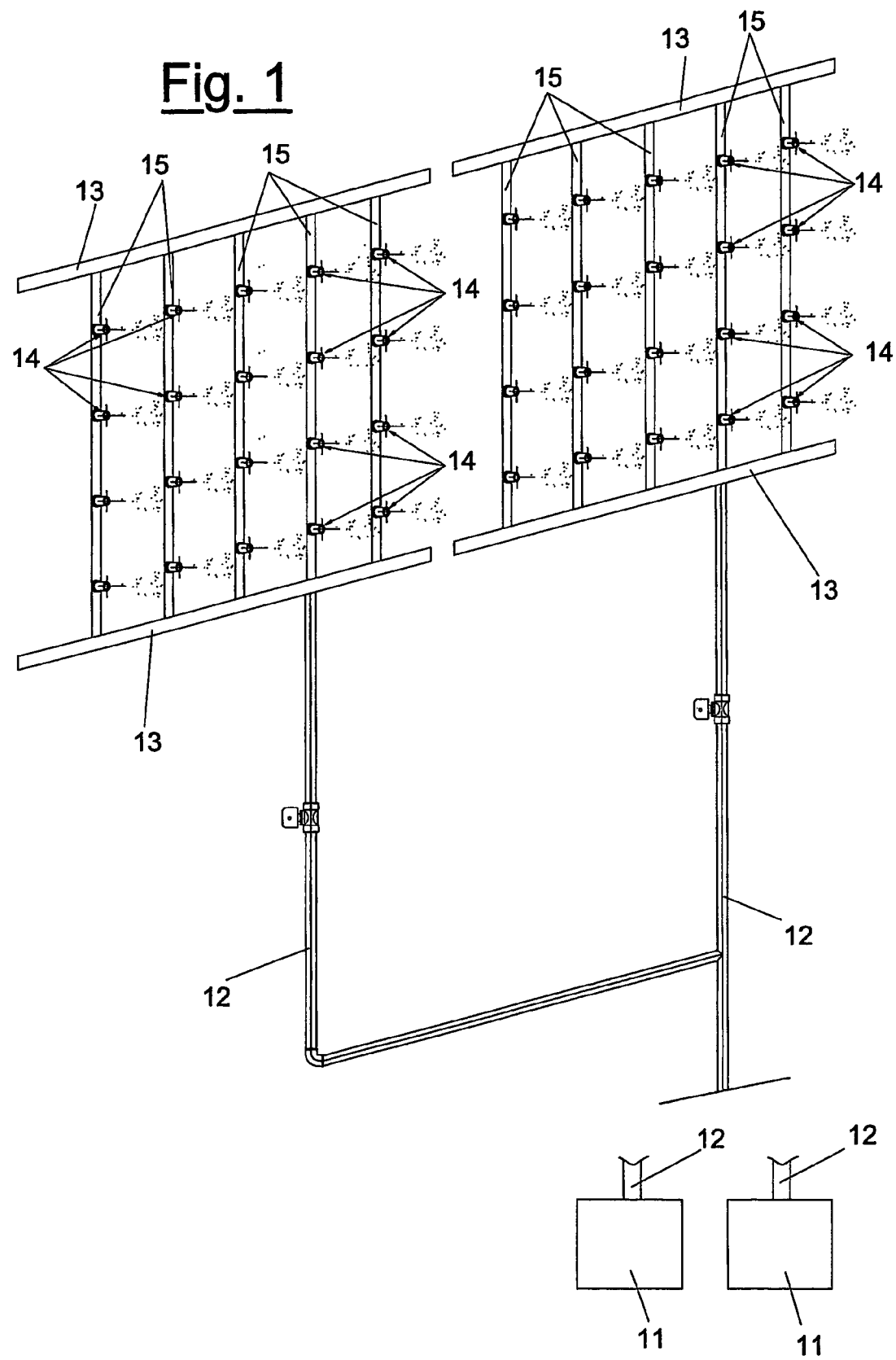

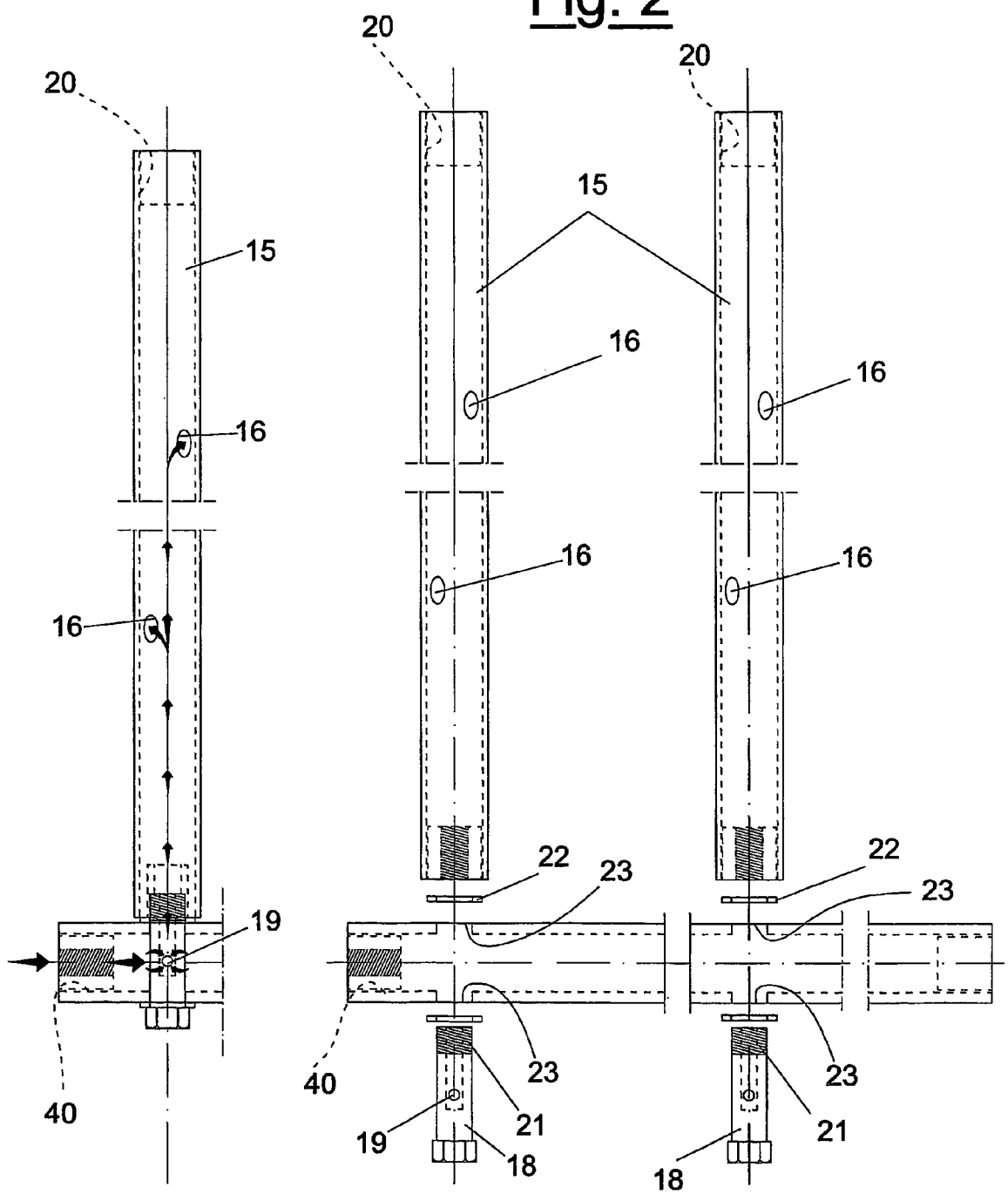

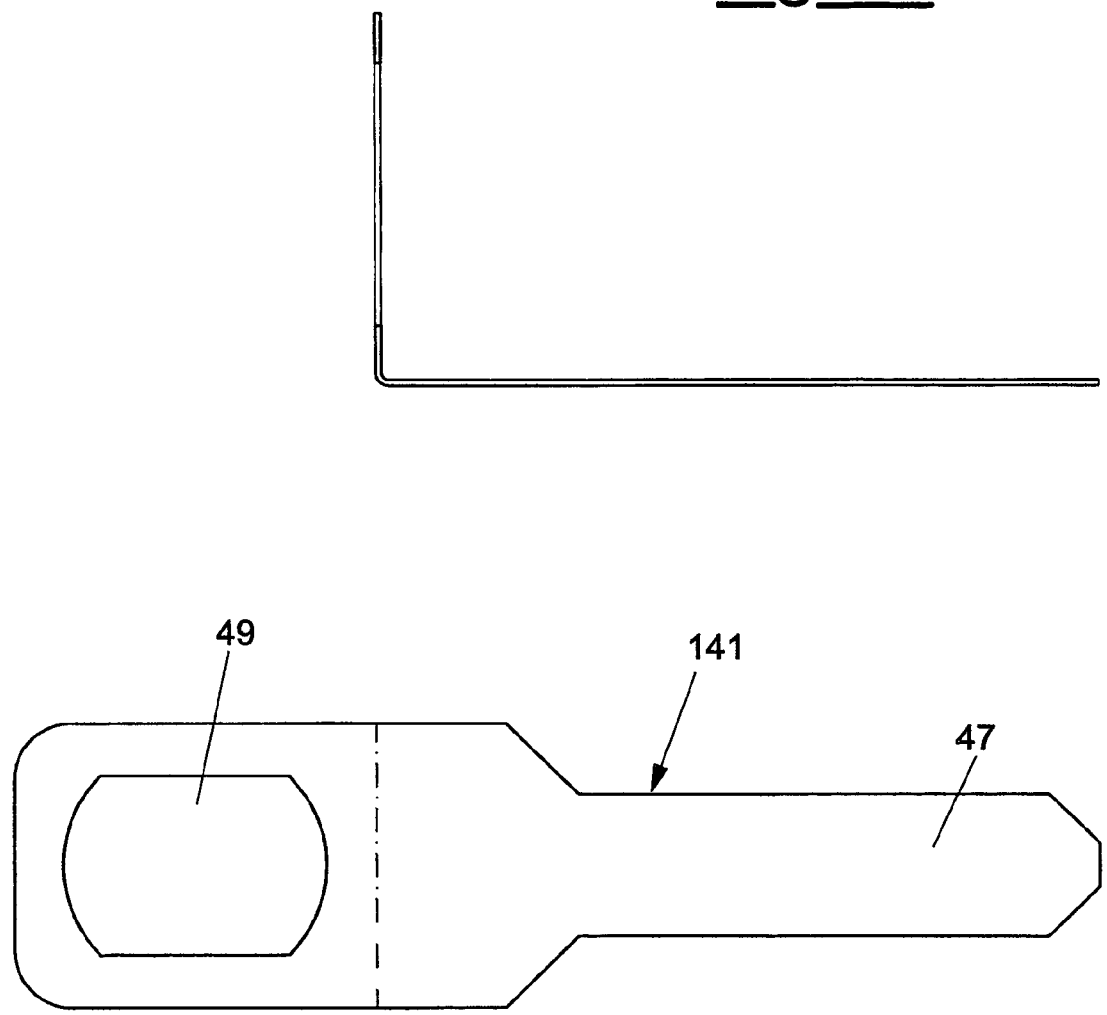

VAPORIZATION WATER DISTRIBUTION PLANT

The present invention relates to a vaporization water distribution plant, in particular used by machines and plants for the feeding of gas turbines.

The current plant engineering market offers a wide range of configurations and applications suitable for vaporization water distribution.

Together with structures assembled in loco for the mechanical welding and/or joining of different components, the market offers a wide range of pre-assembled structures which are mainly envisaged for small and medium-sized plants.

The variants so far proposed involve the assembly of the various components with partial or total resort to welding operations of the components.

In particular, plants destined for gas turbine installations must be easy to assemble as they are linked to the stoppage time of auxiliary gas turbine plants. The owners and/or administrators of these plants allow stoppage times of not more than two or three working days. The stoppage times currently offered by the market are in line with the demands of said owners and/or administrators.

In spite of this, however, a significant variable is represented by the following points:
- assembly and/or pre-assembly times, before the positioning of the plant inside the vaporization chamber;
- transported plant volumes, with the relative encumbrances and costs;
- qualification of the staff assigned to the plant assembly and positioning;
- possible substitutions of plant components;
- their adaptation, particularly in the case of retrofits, to the asymmetrical positioning of the nozzle-holder ramps;
- safety systems of the known components with unreliable elements (for example wire passing through elements of the nozzle, wound and knotted).

The assembly and/or pre-assembly technique can significantly influence the technical-economical results of the installation of said plant. It can also lead, especially when resort is made to pre-assembly, to onerous and delicate transportation problems, entailing large physical dimensions for plants destined for the treatment of comburent air for gas turbines.

The connection operations of the components by welding do not necessarily imply a prolonged assembly time inside the atomization chamber, but extend the assembly times outside the same.

The following problems observed and experienced can generally be enumerated, especially during welding operations which means subjecting the material to particular thermal, physical and chemical conditions.

These operations are exposed to external factors such as:
- compatibility of the materials put in contact with each other;
- conformity of the implementation of the operation with the dictates of the welding process envisaged;
- observation on the part of the operator, during the welding phase, of the regulations imposed by the welding process.

These problems can be easily solved in an adequately equipped industrial environment.

If, however, the installation site does not have an adequate infrastructure technique for supporting these operations, various problems can arise. The water so far used for vaporization or so-called fogging processes is of the demineralized type.

The characteristics of this type of water require a perfect selection of constructive materials in addition to all the connection operations between the plant components.

The implementation and control of the above operations represent an important and delicate phase for the plant assembly. This results in an important time investment on the part of qualified staff with the relative costs. In the case of large dimensional plants, preassembly before the shipment of the plant must be limited, for reasons of transportation encumbrance.

An objective of the present invention is mainly to provide a solution to these possible drawbacks, by reducing the type of elements used and avoiding any possible additional welding operation.

Another objective of the present invention is to produce a cost saving relating to plant assembly and stoppage operations connected with the vaporization water distribution plant.

These and other objectives according to the present invention are achieved by providing a vaporization water distribution plant as illustrated in claim 1.

Further characteristics of the invention are specified in the subsequent claims.

In particular, an object of the invention relates to a plant whose components consist of collectors and distributors for the distribution of chemically and/or physically treated water and the housing seats of the vaporization nozzles.

The dimension and configuration of said plant is advantageously such as to be able to tolerate the operating conditions established by said use or in the vaporization chambers and by the functioning characteristics of the pumps, installed upstream of the present plant.

The plant configurations correspond to the integration criteria and necessities in comburent air treatment sections both for newly constructed and already existing plants.

Finally, the plant of the invention has been conceived according to maximum modularity and above all assembly criteria without welding operations.

The characteristics and advantages of a vaporization water distribution plant according to the present invention will appear more evident from the following illustrative and non-limiting description, referring to the enclosed schematic drawings in which:

FIG. 1 is a raised schematic view of a portion of a vaporization plant illustrating collectors equipped with nozzle-holder ramps and relative nozzles;

FIGS. 2 and 3 show a detail of a nozzle-holder ramp and a collector in a blown-up position and, respectively, assembled;

Figures 4, 5:
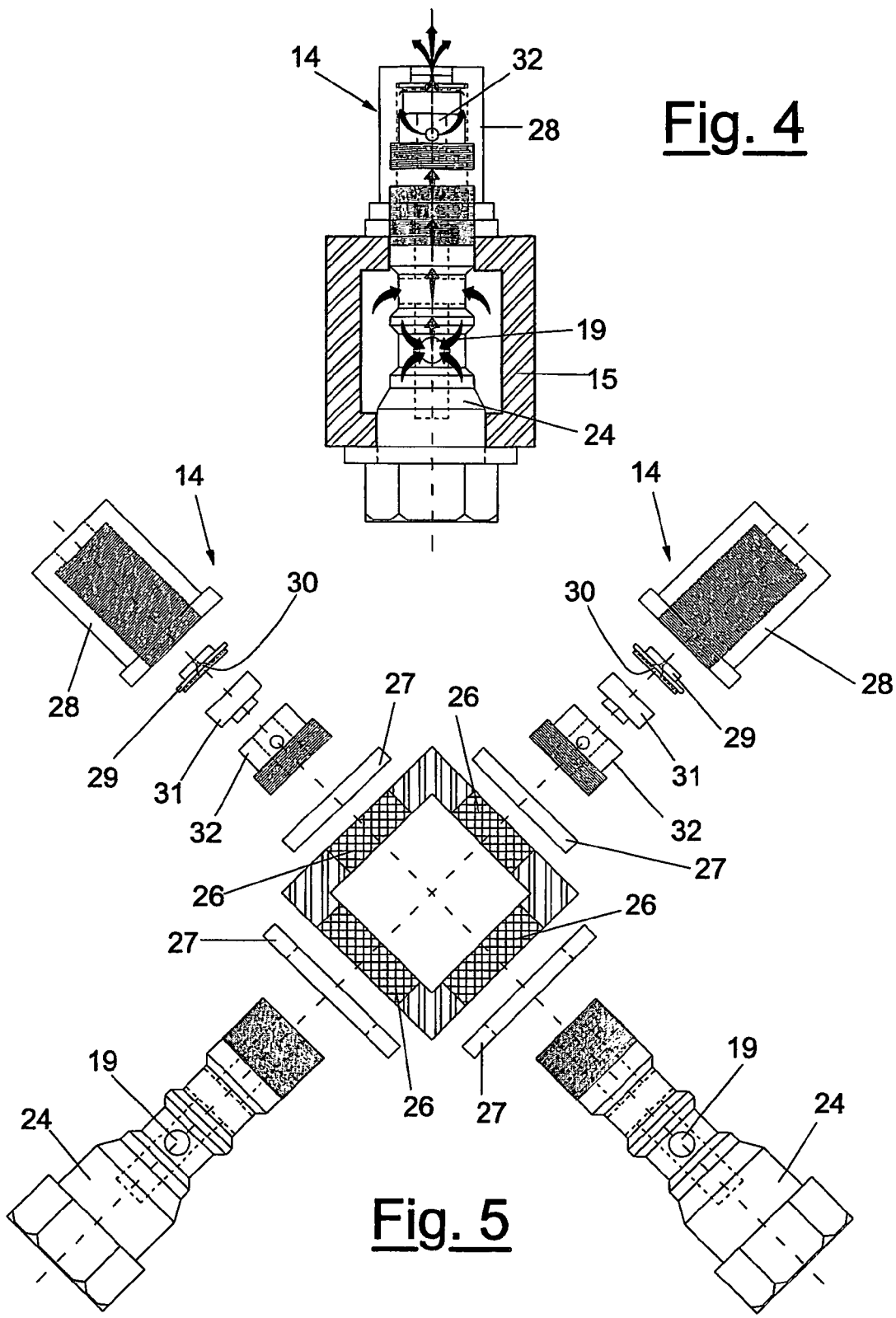
FIG. 4 is an enlarged transversal section assembled in correspondence with a ramp showing the various assembly elements.
Figure 6:
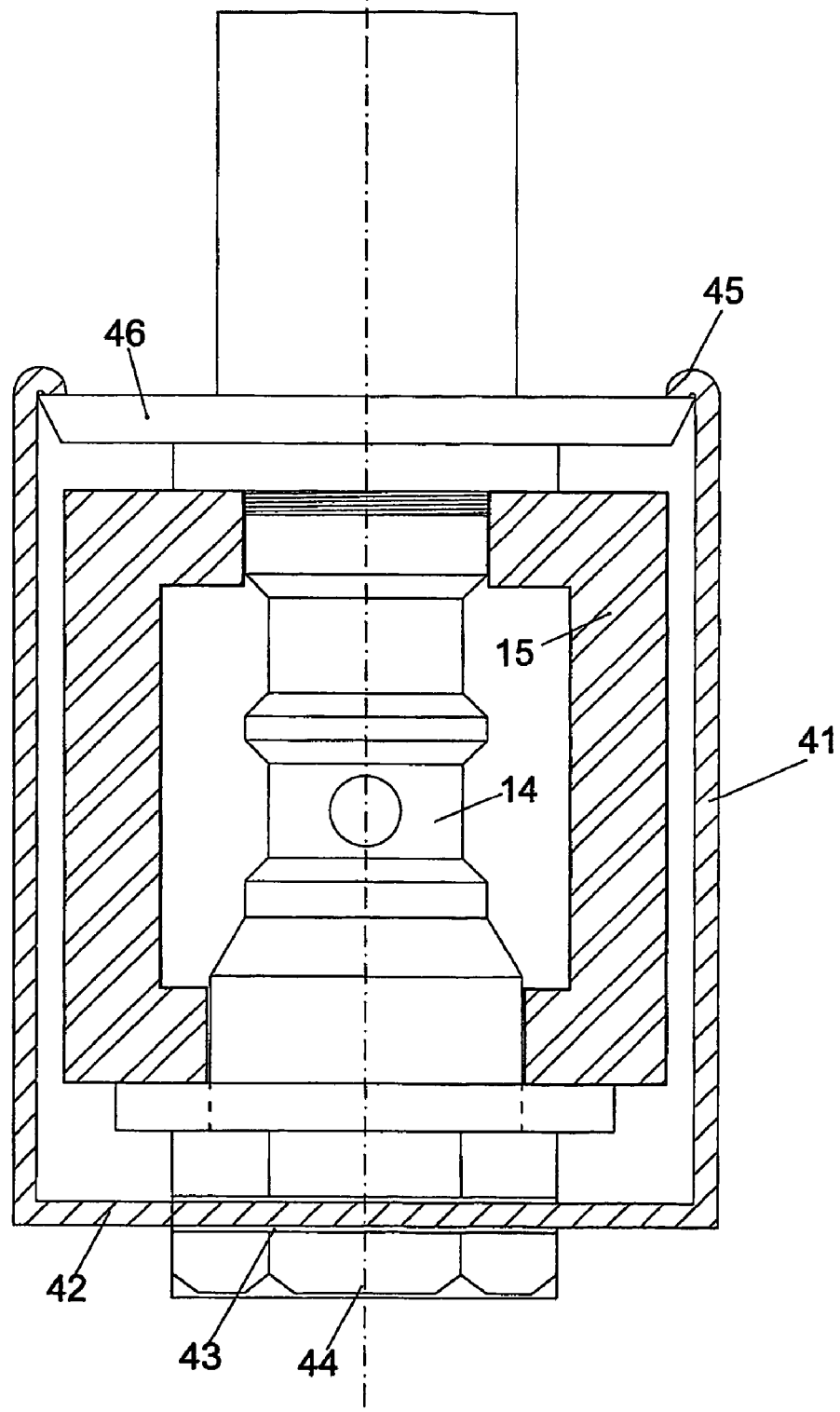
Figure 7A:
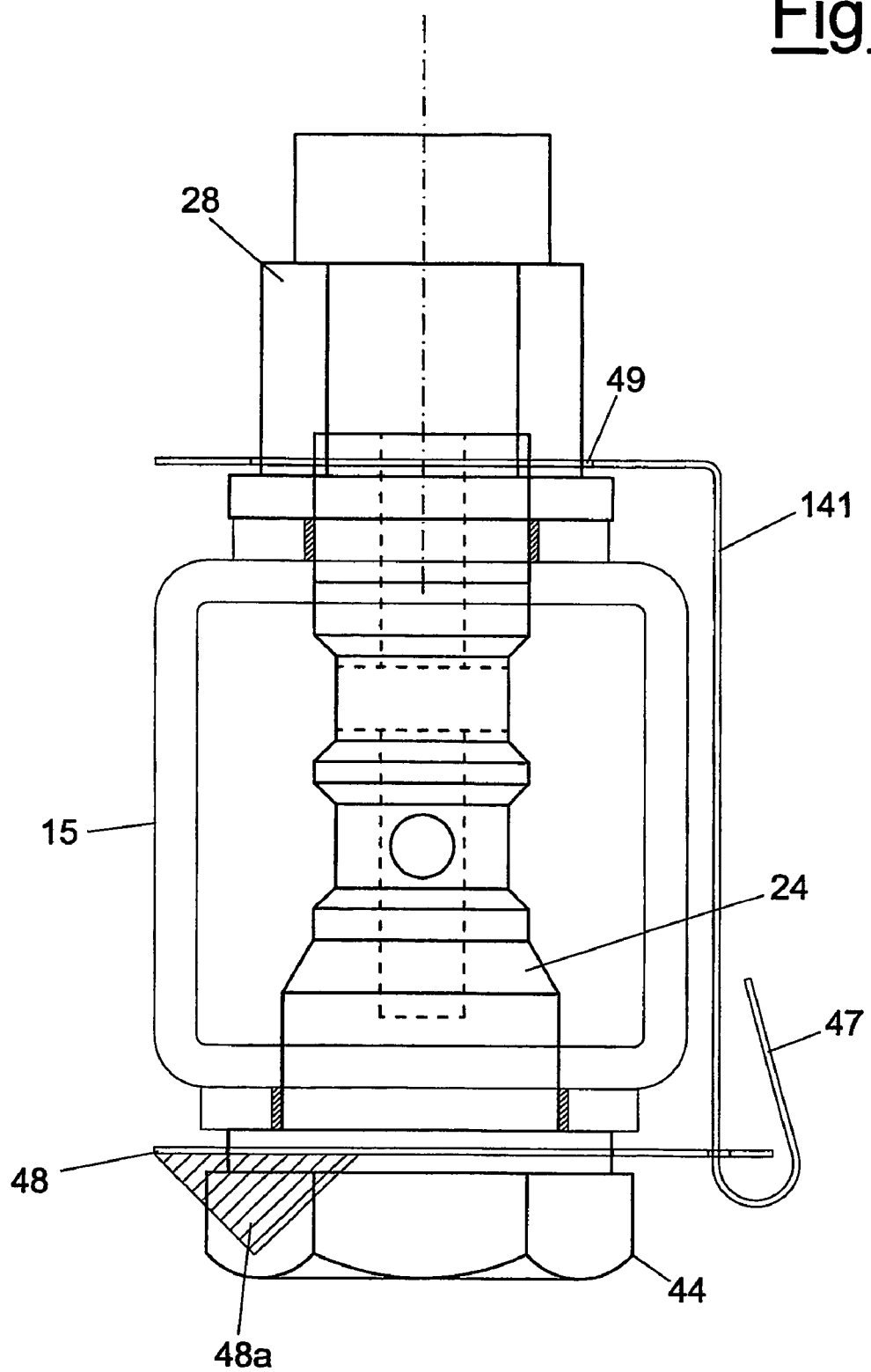
Figure 7C:
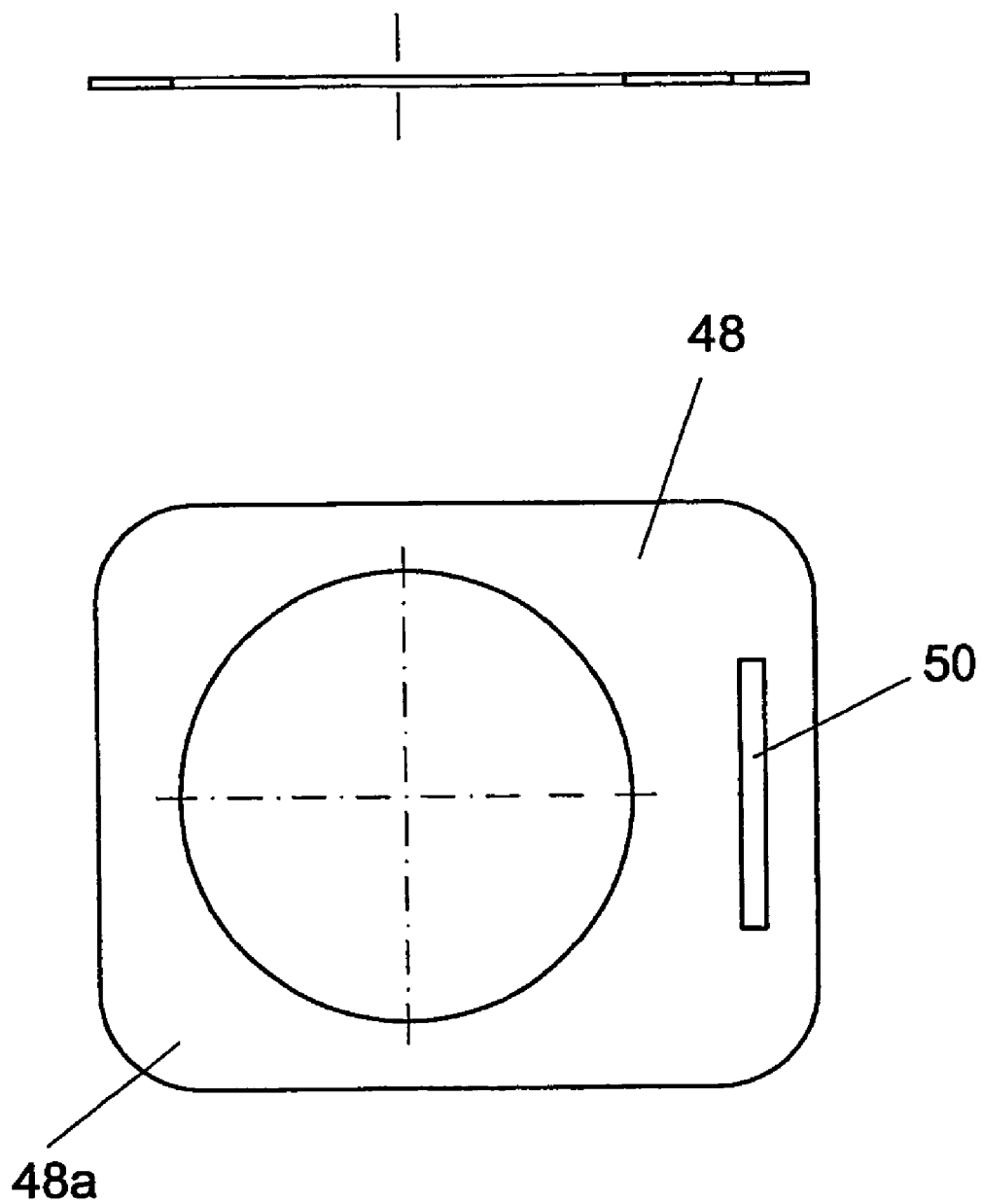

FIG. 5 is a completely analogous view to that of FIG. 4 with a pair of nozzles blown up from a nozzle-holder ramp; and FIG. 6 shows a section similar to FIG. 4 which envisages a shaped blocking element which guarantees a safe positioning of the nozzle, and FIG. 7a shows a section similar to FIG. 6 which envisages a different blocking group for the stable positioning of the nozzle, using the two elements illustrated in FIGS. 7b and 7c in the plan.

With reference to the figures, these show a vaporization water distribution plant upstream of which there are one or more pumps 11 for pressurizing the water which send said water through tubes 12 to collectors 13 equipped with a series of nozzles 14.

The size and configuration of the plant of the invention is such as to be able to tolerate the operating conditions established by use in vaporization chambers set up for air treatment, for example comburent air for the feeding of gas turbines.

As can be seen, nozzle-holder ramps 15 are envisaged which are positioned with respect to the collectors 13 and nozzles 14 which are positioned on the same nozzle-holder ramps 15, with a simple assembly operation, thanks to the particular preparation of the various components.

The collector or collectors 13 and nozzle-holder ramps 15 are made of a material which is corrosion-resistant, preferably of a ferrous derivation (stainless steel), resistant to fluid circulation, such as demineralized water within a pressure range preferably of 70 to 120 bar.

The blocking system proposed in the present invention is facilitated by the use of ducts, both in relation to collectors 13 and nozzle-holder ramps 15, with a square and/or rectangular section. This type of duct also allows the nozzles 14 to be arranged in various housings 16, so as to be out of axis between each other by 90° or a selected angle, referring to an axis 17 of each nozzle-holder ramp 15.

This leads to a high standardization degree for groups of components used.

The invention also envisages first tighteners 18 for the assembly and blockage of the nozzle-holder ramps 15 with respect to the collectors 13 (FIGS. 2 and 3). Said tighteners 18 have the characteristic of allowing the circulation of the water passing through the collector or collectors 13 and sent to the various ramps, and also of allowing, through an appropriately sized hole 19 (for example of about 6 mm), the passage of the water destined for the feeding of the single nozzle-holder ramps. The blockage is effected by means of an outer threaded end 21 of the tightener which acts on an internal threaded seat 20 situated at free ends of the ramps 15, with the collaboration of relative washers 22. Each tightener 18 is naturally positioned in a series of relative pass-through holes or openings 23 which are situated in the collectors 13.

There are also further tighteners 24 for the assembly and blockage of the nozzles 15 (FIGS. 4 and 5) which are constructed using the same construction system described above with a water passage hole 19. As the destination is different, the dimensions are also different, considering the different water flow-rates implied.

These additional tighteners 24 have a threaded outer end 25 which passes through holes 26 of the ramp 15 and a high pressure washer 27 in both perforated sides thereof.

The outer threading 25 at the free end of this latter tightener 24, allows the insertion of a cylindrical body 28 of the vaporization nozzles 14 envisaged. A diffuser disk 29 with an ejection nozzle 30, is housed on said cylindrical body 28 (FIGS. 4 and 5), together with a sealing disk 31 and a distribution and clenching element 32 forming a mechanically autonomous unit, for both the vaporizing functions assigned and also for the blocking and sealing of its internal components.

This construction allows the nozzles 14 to be interchanged and also provides a specific solution for the vaporization of possible, different quantities of water in the various ramps 15 envisaged, thus allowing a quantitative differentiation of the volume of vaporization water distributed.

The nozzle-holder ramps 15 can be envisaged in the plant with either a symmetrical or asymmetrical distance between each other. This latter arrangement allows concentration in particular applicative cases, such as for example the cooling of the comburent air destined for the gas turbine feeding.

In the case of particular applications, the collector or collectors 13 can be envisaged in an equalizing function of the water flow-rates and pressure also at the end of the nozzle-holder ramps 15 (FIG. 1).

The collectors 13 and nozzle-holder ramps 15, with a square and/or rectangular section, can be equipped with open ends and with threadings 40 and 20 to form segments of a desired length or to receive closing plates (not shown).

The necessity of operating in very narrow working and assembly times, thus avoiding the operative risks mentioned above, has led to the solution object of the present invention.

The assembly of the vaporization water distribution plant, object of the present invention, is therefore evident.

It is effected by means of screwing with the relative blockage of the relevant components. No welding operation is envisaged either for the assembly or for the pressure sealing of the components envisaged herein.

FIGS. 2-5 show the various components and their positioning inside the plant.

FIG. 6 shows an assembly section of the nozzle 14 of the nozzle-holder ramp 15 in which there is a shaped blocking element 41 which guarantees a safe positioning of the nozzle. In particular, this element 41 is U-shaped, it is fixed in its base 42 inside a hollow housing 43 situated in the hexagonal head 44 of the tightener 24, and comprises curved elements 45 at its free ends, suitable for being hooked to a plate 46 integral with the nozzle 14.

FIGS. 7a, 7b and 7c show an assembly section of the nozzle 14 of the nozzle-holder ramp 15 in a further embodiment.

In particular, in this further example, there is an assembly section of the nozzle 14 of the nozzle-holder ramp 15 by means of the elements illustrated in plan of FIGS. 7b and 7c. In particular, a first blocking element 141 has an insertion hole 49 for withholding the nozzle 14 in direct contact with the cylindrical shaped body 28. A tongued terminal part 47 is inserted and blocked, by folding, in a slit 50 situated in a second blocking element 48, perforated in the centre, which is fixed on the tightener 24. Furthermore, the blocking of the tightener 24 is also obtained on the hexagonal head 44 by the folding of a portion of the edge 48a of the blocking element 48.

In this way, as with the two examples illustrated, a safety system of the components of the invention is provided, which prevents these from falling from the group with the possibility of the components being entrained by the stream of air towards the moving organs of the turbine (not shown).

The plant thus conceived allows the type and number of components to be rationalized. This enables said components to be transported either individually and/or in product groups, thus allowing rationalization of the packaging and transportation means.

From experiences so far acquired, the pressure sealing is ensured.

It can thus be observed that a vaporization water distribution plant according to the present invention achieves the objectives specified above.

Numerous modifications and variants can be applied to the vaporization water distribution plant of the invention thus conceived, all included within the same inventive concept.

Furthermore, in practice, the materials used, as well as their dimensions and components can vary according to technical demands.

The invention claimed is:

1. A water vaporization distribution plant consisting of at least one feeding collector (13) with nozzle-holder ramps (15) equipped with a series of vaporization nozzles (14), in which there are first tighteners (18) for assembly and blockage of the nozzle-holder ramps (15) with respect to the at least one collector (13), and second tighteners (24) for assembly and blockage of said vaporization nozzles (14) to said nozzle-holder ramps (15), wherein said nozzle-holder ramps (15) have a square or rectangular section, and in correspondence with said vaporization nozzles (14) there is a shaped blocking element for positioning of said vaporization nozzles (14) on said nozzle-holder ramps (15).

2. The water vaporization distribution plant according to claim 1, characterized in that said at least one feeding collector (13) comprises a series of side openings (23) for inflow feeding of water into said nozzle-holder ramps (15) which determine outflow distribution of water from said vaporization nozzles (14).

3. The water vaporization distribution plant according to claim 2, characterized in that said side openings (23) for inflow feeding of water into said nozzle-holder ramps (15) which determine outflow distribution of water from said vaporization nozzles (14) are arranged at a distance and at a constant pitch between each other.

4. The water vaporization distribution plant according to claim 1, characterized in that said at least one feeding collector (13) and said nozzle-holder ramps (15) are made of corrosion-resistant steel.

5. The water vaporization distribution plant according to claim 1, characterized in that said nozzle-holder ramps (15) for the feeding to said nozzles are equipped with side openings (16) for housing and fixing of said vaporization nozzles (14).

6. The water vaporization distribution plant according to claim 5, characterized in that said nozzle holder ramps (15) having first ends and second ends, said first ends of said nozzle holder ramps (15) being equipped with threaded sections (20) for closure of said nozzle holder ramps (15) on said first ends.

7. The water vaporization distribution plant according to claim 1, characterized in that said first and second tighteners (18, 24) include at least one side feeding hole (19) for passage of circulating water.

8. The water vaporization vaporization water distribution plant according to claim 7, characterized in that said second tighteners are made of corrosion-resistant steel.

9. The water vaporization distribution plant according to claim 8, characterized in that said first tighteners and second tighteners (18, 24) are made of corrosion resistant steel by means of turning, perforating and threading operations, with work tolerances resistant to expected operating pressures and higher than 50 bar.

10. The water vaporization distribution plant according to claim 1, characterized in that said shaped blocking element is U-shaped with a base and two free ends wherein said U-shaped blocking element (41), is fixed at a base (42) inside an indentation (43) of a hexagonal head (44) of said second tighteners (24), and includes curved elements (45) at each of said two free ends of said shaped blocking element, said curved elements (45) being adapted for being hooked to a plate (46) integral with a vaporization nozzle (14).

11. The water vaporization distribution plant according to claim 1, characterized in that said shaped blocking element comprises a first blocking element (141) which has an insertion hole (49) for holding the vaporization nozzle (14) in direct contact with a cylindrical shaped body (28) and a tongued terminal part (47) which is inserted and blocked, by folding, in a slit (50) situated in a second blocking element (48), that is perforated in the centre, and is fixed on said second tighteners (24).

12. A water vaporization distribution plant consisting of at least one feeding collector (13) with nozzle-holder ramps (15) equipped with a series of vaporization nozzles (14), in which there are first tighteners (18) for assembly and blockage of the nozzle-holder ramps (15) with respect to the at least one collector (13), and second tighteners (24) for assembly and blockage of said vaporization nozzles (14) to said nozzle-holder ramps (15), wherein said nozzle-holder ramps (15) have a square section, and in correspondence with said vaporization nozzles (14) there is a shaped blocking element for positioning of said vaporization nozzles (14) on said nozzle-holder ramps (15) and wherein said first and second tighteners (18, 24) include at least one side feeding role (19) for passage of circulating water, said second tighteners (24) being made of corrosion-resistant steel.

13. The water vaporization distribution plant according to claim 12, characterized in that said first tighteners and second tighteners (18, 24) are made of corrosion resistant steel by means of turning, perforating and threading operations, with work tolerances resistant to expected operating pressures and higher than 50 bar.

14. The water vaporization distribution plant according to claim 12, characterized in that said shaped blocking element is U-shaped with a base and two free ends wherein said U-shaped blocking element (41), is fixed at a base (42) inside an indentation (43) of a hexagonal head (44) of said second tighteners (24), and includes curved elements (45) at each of said two free ends of said shaped blocking element, said curved elements (45) being adapted for being hooked to a plate (46) integral with a vaporization nozzle (14).

15. The water vaporization distribution plant according to claim 12, characterized in that said shaped blocking element comprises a first blocking element (141) which has an insertion hole (49) for holding the vaporization nozzle (14) in direct contact with a cylindrical shaped body (28) and a tongued terminal part (47) which is inserted and blocked, by folding, in a slit (50) situated in a second blocking element (48), that is perforated in the centre, and is fixed on said second tighteners (24).

16. A water vaporization distribution plant consisting of at least one feeding collector (13) with nozzle-holder ramps (15) equipped with a series of vaporization nozzles (14), in which there are first tighteners (18) for assembly and blockage of the nozzle-holder ramps (15) with respect to the at least one collector (13), and second tighteners (24) for assembly and blockage of said vaporization nozzles (14) to said nozzle-holder ramps (15), wherein said nozzle-holder ramps (15) have a square or rectangular section, and in correspondence with said vaporization nozzles (14) there is a shaped blocking element for positioning of said vaporization nozzles (14) on said nozzle-holder ramps (15) wherein said shaped blocking element is U-shaped with a base and two free ends wherein said U-shaped blocking element (41), is fixed at a base (42) inside an indentation (43) of a hexagonal head (44) of said second tighteners (24), and includes curved elements (45) at each of said two free ends of said shaped blocking element, said curved elements (45) being adapted for being hooked to a plate (46) integral with a vaporization nozzle (14).

17. The water vaporization distribution plant according to claim 16, characterized in that said first and second tighteners (18, 24) include at least one side feeding hole (19) for passage of circulating water.

18. The water vaporization vaporization water distribution plant according to claim 17, characterized in that said second tighteners (24) are made of corrosion-resistant steel.

19. The water vaporization distribution plant according to claim 18, characterized in that said first tighteners and second tighteners (18, 24) are made of corrosion resistant steel by means of turning, perforating and threading operations, with work tolerances resistant to expected operating pressures and higher than 50 bar.

20. The water vaporization distribution plant according to claim 16, characterized in that said shaped blocking element comprises a first blocking element (141) which has an insertion hole (49) for holding the vaporization nozzle (14) in direct contact with a cylindrical shaped body (28) and a tongued terminal part (47) which is inserted and blocked, by folding, in a slit (50) situated in a second blocking element (48), that is perforated in the centre, and is fixed on said second tighteners (24).

* * * * *